United States Patent [19]

Gregerson

[11] 4,023,622

[45] May 17, 1977

[54] TRACTOR WITH DRAFT LOAD CONTROL

[75] Inventor: Stanley Martin Gregerson, Cedar Falls, Iowa

[73] Assignee: Deere & Company, Moline, Ill.

[22] Filed: Sept. 15, 1975

[21] Appl. No.: 613,548

[52] U.S. Cl. ............................................ 172/9; 172/3
[51] Int. Cl.² ................................................ A01B 63/112
[58] Field of Search .................. 172/2, 3, 4, 7, 8, 9, 172/10, 11, 12; 180/14 R, 14 D, 66 R, 100, 103; 91/411 R, 412, 413

[56] References Cited

UNITED STATES PATENTS

| | | | |
|---|---|---|---|
| 2,940,530 | 6/1960 | Du Shane | 172/7 |
| 3,412,811 | 11/1968 | Thompson | 172/7 |
| 3,550,688 | 12/1970 | Norcliffe | 172/9 |
| 3,575,241 | 4/1971 | McKeon et al. | 172/3 |
| 3,753,467 | 8/1973 | Wilson | 172/3 |

Primary Examiner—Richard T. Stouffer

[57] ABSTRACT

A hydrostatic drive tractor having a hydraulically lowerable and raisable hitch to lower and raise an associated implement to respectively increase or decrease draft load includes a draft control system sensing increases and decreases in the hydrostatic drive pressure which are proportional to draft load as sensed by the drive wheels to activate valving to respectively raise and lower the hitch.

2 Claims, 3 Drawing Figures

U.S. Patent   May 17, 1977   4,023,622
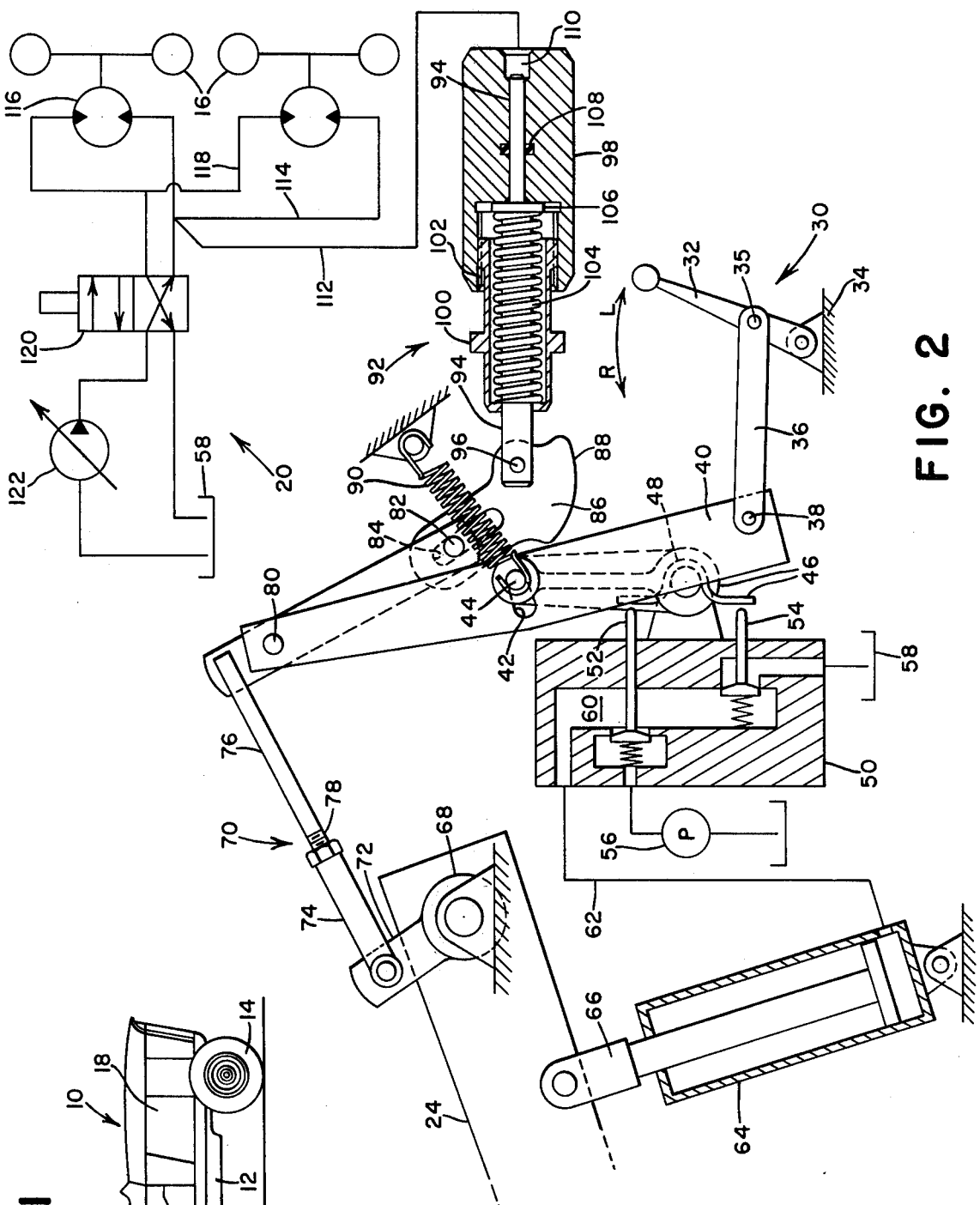

TRACTOR WITH DRAFT LOAD CONTROL

BACKGROUND OF THE INVENTION

This invention relates generally to a draft control system for an agricultural tractor and more particularly to a draft control system for a hydrostatic drive tractor wherein the hydrostatic drive pressure is sensed to adjust the hitch to vary the working depth of an implement so as to not exceed a maximum draft load and draft depth.

In the past, tractors have been provided with hydraulic lift systems for automatically raising or lowering an associated integral or semi-integral implement in order to maintain a substantially constant implement draft or draft load on the tractor. The draft load on the tractor has been generally sensed as a force exerted on the draft links of the tractor as shown in the Du Shane U.S. Pat. No. 2,940,530 granted on June 14, 1960.

In tractors having main drive wheels mechanically connected to the engine, a complex torque sensing coupling had to be interposed in the drive line between the engines and the wheels as shown in the McKeon U.S. Pat. No. 3,575,241 granted on Apr. 20, 1971.

SUMMARY OF THE INVENTION

It is a general object of the present invention to provide a simple draft control system for a hydrostatic drive tractor. The control system includes a pressure sensor sensing the hydraulic pressure in the input line to the hydraulic wheel drive motors to provide an output for a linkage system which selectively activates and deactivates a control to selectively allow and block the passage of pressurized fluid to and from a hydraulic cylinder which adjusts the hitch.

BRIEF DESCRIPTION OF THE DRAWINGS

FIG. 1 is a side view of a hydrostatic drive tractor embodying the draft control system of the present invention.

FIG. 2 is a schematic diagram of the draft control system of the present invention.

FIG. 3 is a side view of a component of the present invention showing an alternate embodiment superimposed thereon.

DESCRIPTION OF THE PREFERRED EMBODIMENT

Referring now to FIG. 1, therein is shown a hydrostatic drive tractor generally designated at 10. The tractor 10 includes a main frame 12 supported by pairs of support wheels 14 and main drive wheels 16. The main frame 12 supports an engine 18 which is connected to a hydrostatic transmission 20. The tractor 10 further includes a pair of draft links 22 and a hitch arm 24 which are adapted for the connection of an integral or semi-integral ground working implement (not shown).

Referring now to FIG. 2, therein is shown a draft control system generally designated by the numeral 30. The draft control system includes a draft control lever 32 pivotally carried, together with other components to be presently described, in a secondary housing or casing, such as that shown at 34. The lever 32 is connected by a connecting pin 35, a connecting link 36 and a control pin 38 to an intermediate link 40.

The intermediate link 40 has a slot 42 medially positioned therein in which a valve lever pin 44 slides. The valve lever pin 44 is integral with a valve lever 46 which is pivotally mounted by a valve pin 48 on a hitch control valve 50. The valve 50 includes a pump poppet 52 and a reservoir poppet 54 which are engageable with portions of the valve lever 46 so as to open ports to fluidly connect, respectively, a cylinder pump 56 and a reservoir 58 with an internal chamber 60 in the valve 50. In the neutral position, the poppets are clear to the valve lever 46 and both ports in valve 50 are closed.

The internal chamber 60 is connected by a fluid line 62 with the head end of a hydraulic cylinder 64. The rod end 66 of the cylinder 64 is pivotally connected to the hitch arm 24. The hitch arm 24 is supported by a rockshaft 68 for rotative motion relative to the tractor 10 as the cylinder 64 extends and retracts.

The rockshaft 68 is connected by an integral rockshaft ear 72 to a position sensor generally designated at 70. The position sensor 70 includes an internally threaded link 74 which threadedly engages an externally threaded, position sensor link 76 by a thread and nut assembly 78; the thread and nut assembly 78 being used to compensate for manufacturing tolerances. The position sensor link 76 has a flat portion having therein a position sensor pin 80 by which the position sensor link 76 and the intermediate link 40 are pivotably interconnected. At one end of the flat portion of the position sensor link 76 is a position pin 82 which is slidably and rotatably positioned in a cam slot 84 of a cam link 86.

The cam link 86 includes a cam profile 88 which in the operative position abuts the valve lever pin 44 and operates to oppose the force imposed on the valve lever pin 44 by a valve lever spring 90 in a manner to be hereinafter described.

A pressure sensor 92 contains a piston 94 which is connected by a piston pin 96 to the cam link 86. The piston 94 is slidably positioned in a body member 98. The body member 98 contains an internal thread 102 into which a response adjusting collar 100 is threaded. When the response adjusting collar is threaded into the body member 98, the preload on a piston spring 104 is increased which applies an increased bias to a piston flange portion 106 of the piston 94. The portion of the piston 94 slidably inserted in the body member 98 is encircled by a seal 108 to prevent leakage along the piston 94 from a pressure chamber 110.

The pressure chamber 110 is connected by a pressure sensing line 112 to a forward direction pressure line 114 which is a part of the hydrostatic transmission 20. The forward direction pressure line 114 is connected to a pair of hydraulic wheel motors 116 which are connected to rotate the main drive wheels 16. The hydraulic wheel motors 116 are connected by a reverse direction pressure line 118 and the forward direction pressure line 114 to the first and second ports, respectively, in the first side of a conventional forward and reverse valve 120. A second side of the forward and reverse valve 120 has a first port connected to a variable volume pump 122 and a second port connected to a reservoir 58

Initially, the draft control system 30 is in the configuration shown in FIG. 2 with the hitch arm 24 in the lowered position. As shown, the hydraulic cylinder 64 is in the retracted position, the valve 50 is in its neutral position, and the pressure sensor 92 is in its null pressure position.

To raise the hitch arm 24 and the associated integral or semi-integral implement, the operator moves the draft control lever 32 in the direction indicated by the arrow and the letter R. Movement of the control lever 32 causes pivotation of the intermediate link about the sensor pin 80. Since the valve lever pin 44 is kept in abutting relationship with the right end of the slot 42 in the intermediate link 40 by the valve lever spring 90, the valve lever 46 is moved counterclockwise about the valve pin 48 to depress the pump poppet 52 to connect the operative cylinder pump 56 with the hydraulic cylinder 64.

As the cylinder 64 extends, the hitch arm 24 raises toward a position proportional to the position of the control lever 32 and the rockshaft 68 is rotated so as to proportionally move the position sensor 70 in an arc determined by the clockwise rotation of the intermediate link 40 about the control pin 38. Movement of the sensor pin 80 end of the intermediate link 40 causes the valve lever 46 to rotate clockwise about the valve pin 48 so that the pump poppet 52 closes off the cylinder pump 56 from the hydraulic cylinder 64 at a predetermined height of the hitch arm 24 which is proportional to the position of the control lever 32.

While the tractor is stationary, the hydraulic wheel motors 116 are not pressurized and thus the pressure sensor 92 is quiescent with the piston 94 retracted into the body member 98 under loading by the piston spring 104.

With the tractor moving, when the operator wishes to lower the implement, the control lever 32 is moved in the direction indicated by the arrow and the letter L. The movement of the control lever 32 results in counterclockwise movement of the intermediate link 40 about the sensor pin 80. This movement allows the valve lever 46 to move clockwise under urging of the valve lever spring 90 to abut the reservoir poppet 54 so as to connect the hydraulic cylinder 64 with the reservoir 58.

As the fluid drains from the cylinder 64, the hitch arem 24 is lowered toward a position proportional to the position of the control lever 32 and the rockshaft 68 rotates so as to proportionally move the position sensor 70 about an arc defined by the intermediate link 40 pivoting counterclockwise about the control pin 38. Movement of the intermediate link 40 causes counterclockwise rotation of the valve lever 46 to release the reservoir poppet 54 and return the valve 50 to a neutral position wherein the cylinder 64 is blocked both from the cylinder pump 56 and the reservoir 58.

As the hitch arm 24 is lowered, an increasing draft load is imposed on the hitch arm 24 and the draft links 22 by the implement entering the ground. The draft load which may be variable due to different soil conditions appears as a force acting to retard the tractor 10. The hydraulic pressure in the forward direction pressure line 114 of the hydrostatic transmission 20 is increased by the pump 122 until the pressure is proportional to the draft load in order to maintain a constant speed.

Initially, when it is desired to have the draft control system 30 purely position responsive with the implement depth proportional to the control lever 32 setting, the pressure sensor 92 is set with the response adjusting collar 100 threaded into the body member 98 so as to preload the piston spring 104 sufficiently to prevent movement of the piston 94 under the maximum hydrostatic transmission pressure.

The draft response of the draft control system 30 may be changed by changing the preload on the piston spring 104 by appropriate turning of the response adjusting collar 100. The preload setting is proportional to the maximum operating draft load beyond which the implement will be raised in order to decrease the draft load.

To activate the draft responsiveness of the draft control system around a predetermined depth, the operator adjusts the response adjusting collar 100 on the run so as to allow the piston 94 to move out of the valve body member 98 in response to the hydrostatic drive pressure in the pressure chamber 110. The outward movement of the piston 94 causes translation and clockwise rotation of the cam link 86 relative to the piston pin 96 as the cam slot 84 slides along position pin 82. The adjustment is made until the cam profile 88 of the cam link 86 abuts the valve lever pin 44 without causing activation of the valve 50.

When the draft load decreases, the cam link 86 moves out of abutting relationship with the valve lever pin 44 and thus the position of the hitch arm 24 is not affected.

When the draft load increases, the cam profile 88 of the cam link 86 abuts the valve lever pin 44 and moves it away from the right end of the slot 42 to cause activation of the valve 50 so as to connect the pump 56 with the hydraulic cylinder 64. As the cylinder 64 extends, the hitch arm 24 rises causing the position sensor 70 to move in an arc defined by the clockwise rotation of the intermediate link 40 about the control pin 38. The movement of the position sensor 70 causes clockwise rotation of the cam link 86 about the piston pin 96. The cam profile 88 is of a predetermined configuration such that a predetermined ratio of position sensor movement to piston 94 movement occurs before the valve lever pin 44 and the valve lever are allowed to rotate so as to bring the valve 50 to the neutral position. The configuration is chosen so as to provide an optimum balance between position and draft control over a variety of terrains.

As the draft load decreases due to the raising of the implement, the piston 94 of the pressure sensor 92 will retract allowing the valve lever pin 44 to move towards the right end of the slot 42 under the urging of the valve lever spring 90. The valve lever 46 will then move to cause the valve 50 to connect the cylinder 64 to the reservoir 58 to allow the hitch arm 24 to lower. The hitch arm 24 lowers until it is positioned proportional to the position of the control lever 32 and the position sensor 70 returns to the initial position, and the valve lever 46 and the valve 50 are in their respective neutral and ports blocked positions.

The draft control system 30 further provides the feature of being able to lift the hitch arm 24 by the application of external force thereupon with the cylinder pump 56 inoperative. Movement of the hitch arm 24 first causes the cylinder piston to draw a vacuum and then causes the position sensor 70 to move so as to connect the cylinder 64 with the reservoir 54.

In an alternate embodiment, pure draft control is obtainable by insertion of the cam link 186 having a cam profile 188 in place of the cam link 86. The difference between the cam profiles 88 and 188 is that in the cam link 186 the locus of points along the cam profile 188 are equidistant from the piston pin 96 whereas the locus is changed in a predetermined proportion in the cam link 86 as shown by the dotted profile in FIG. 3. This has the same physical effect as permitting the piston 94 to abut the valve lever pin 44 directly. The operative effect is to cause the draft control system 30 to be purely draft load responsive around the preselected depth in response to pressure variations above and below the predetermined pressure set by the response adjusting collar 100.

When the hitch arm 24 is set and the predetermined pressure set, an increase in draft load will cause the hitch arm 24 to be raised. Raising of the hitch arm 24 in this embodiment does not feed back through the position sensor 70 to return the valve 50 to neutral. Instead, the draft load as sensed by the pressure sensor 92 must decrease before the valve 50 is returned to neutral. Similarly, a decrease in draft load will allow the hitch arm 24 to be lowered and the lowering will not be stopped until the draft load increases to the predetermined value.

Various other features and advantages of the invention, not categorically enumerated herein, will undoubtedly occur to those versed in the art, as will many modifications and alterations in the preferred embodiments of the invention disclosed, all of which may be achieved without departing from the spirit and scope of the invention.

I claim:

1. In a tractor having an engine, a pair of main drive wheels, a pair of hydraulic wheel motors including output shafts operatively connected to the main drive wheels, a hydraulic pump driven by the engine to provide pressurized fluid, a hydraulic system operatively interconnecting the pump and the motors to supply pressurized fluid from the pump to the motors, adjustable hitch means adapted to support an integral or semi-integral ground working implement, position sensing link means proportionally movable with the hitch means in accordance with the adjustment thereof, hydraulic adjusting means for raising or lowering the hitch means and any implement supported thereby, a fluid pressure source for the hydraulic adjusting means, valve means for permitting or blocking the flow of fluid to and from the hydraulic adjusting means to respectively raise and lower the hitch means, a draft control system comprising: pressure sensing means including a body member having a longitudinal bore therein connected at one end to the hydraulic system and slidingly sealed at the other by piston means urged in one direction by the fluid pressure in the transmission means, and urged in a direction opposite to the one direction by biasing means; pressure sensing link means pivotally connected to the piston means at one end, slidingly engaging the position sensing link means at the end opposite the one end, and slidingly abutting valve link means for controlling the valve means to allow flow of fluid to the hydraulic adjusting means in response to increasing fluid pressure in the transmission means above a predetermined valve and to allow flow of fluid from the hydraulic adjusting means in response to raising of the hitch means as sensed by the position sensing means; and biasing means urging the valve link means to control the valve means to allow flow of fluid from the hydraulic adjusting means.

2. A tractor including an engine, hydrostatic traction means, hydrostatic transmission means for transmitting engine torque to the traction means, adjustable hitch means adapted to support an integral or semi-integral ground working implement, position sensing link means movable in response to adjustment of the hitch means, hydraulic cylinder means for raising and lowering the hitch means and any implement supported thereby, a fluid pressure source for the hydraulic cylinder means, valve means for controlling the flow of fluid to and from the hydraulic cylinder means to respectively raise and lower the hitch means, valve lever means movable in a first and second directions to respectively permit fluid flow to and from the hydraulic cylinder means, means biasing the valve lever means in the second direction to lower the hitch means, means sensing fluid pressure generated in the transmission means including piston means slidably mounted in a bore provided in a body member and in fluid communication with the transmission means whereby the piston means is urged in one direction by the fluid pressure in the transmission means, biasing means urging the piston means in a direction opposite the one direction, can means connected to the piston means and the position sensing link means and slidably abutting the valve lever means responsive to piston means movement to urge the valve lever means in the first direction to raise the hitch means upon transmission means pressure exceeding a predetermined value and to lower the hitch means upon transmission means pressure decreasing below the predetermined value, means operatively associated with the piston means for setting the predetermined value, intermediate link means connected to and movable by the position sensing link means and further operatively connected to the valve lever means to urge the valve lever means in the first direction, manually operable means connected to the intermediate link for moving the intermediate link proportional to desired hitch position.

* * * * *

UNITED STATES PATENT OFFICE
CERTIFICATE OF CORRECTION

Patent No. 4,023,622          Dated 17 May 1977

Inventor(s) Stanley Martin Gregerson

It is certified that error appears in the above-identified patent and that said Letters Patent are hereby corrected as shown below:

Column 6, line 5 delete "valve" and insert --value--;
line 33, delete "can" and insert --cam--.

Signed and Sealed this

Sixth Day of December 1977

[SEAL]

Attest:

RUTH C. MASON
Attesting Officer

LUTRELLE F. PARKER
Acting Commissioner of Patents and Trademarks